United States Patent [19]

Scheffler

[11] Patent Number: 5,027,194
[45] Date of Patent: Jun. 25, 1991

[54] METHOD FOR REDUCING NOISE AND CROSS-COLOR INTERFERENCE IN TELEVISION SIGNALS, AND APPARATUS FOR PERFORMING THE METHOD

[75] Inventor: Günter Scheffler, Munich, Fed. Rep. of Germany

[73] Assignee: Siemens Aktiengesellschaft, Munich, Fed. Rep. of Germany

[21] Appl. No.: 359,100

[22] Filed: May 31, 1989

[30] Foreign Application Priority Data

May 31, 1988 [DE] Fed. Rep. of Germany ....... 3818539

[51] Int. Cl.$^5$ ............................................. H04N 9/64
[52] U.S. Cl. ..................................... 358/36; 358/167
[58] Field of Search .......................... 358/36, 167, 166

[56] References Cited

U.S. PATENT DOCUMENTS 4,240,106 12/1980 Michael et al. ........................ 358/36
4,658,285 4/1987 Lewis, Jr. .

FOREIGN PATENT DOCUMENTS 3633716 4/1988 Fed. Rep. of Germany .
0167574 8/1985 Japan .

OTHER PUBLICATIONS

German Publication F&KT Book 37, No. 5/1983; "Möglichkeiten der Qualitätsverbesserung beim neutigen Fernsensystem", H. Schönfelder; pp. 187-196.
IEEE Trans. CE-29, 1983, No. 3, Aug., "Application of Picture Memories in Television Receivers", Berkhoff et al; pp. 251-258.

Primary Examiner—James J. Groody
Assistant Examiner—Kim Yen Vu
Attorney, Agent, or Firm—Herbert L. Lerner; Laurence A. Greenberg

[57] ABSTRACT

A method and an apparatus for the simultaneous reduction of noise and cross-color interference in television signals includes a picture processor having a recursive filter for processing a luminance signal and two chrominance signals. The picture processor also has a change detector connected to the recursive filter for determining filter coefficients for both chrominance signals from the luminance signal and feeding the filter coefficients as input signals to the recursive filter. The change detector for the luminance signal has comparison devices with variable thresholds and two evaluation circuits triggered by the comparison devices for defining the filter coefficients for the luminance signal and the chrominance signals.

8 Claims, 2 Drawing Sheets

METHOD FOR REDUCING NOISE AND CROSS-COLOR INTERFERENCE IN TELEVISION SIGNALS, AND APPARATUS FOR PERFORMING THE METHOD

The invention relates to a method and apparatus for simultaneously reducing noise and cross-color interference in television signals, in which a luminance signal and two chrominance signals are each processed in a picture processor with the aid of a recursive filter, and in which the filter coefficients are determined with the aid of a change detector for the input signals of the recursive filter.

With conventional modern standards for the transmission of encoded television signals, such as the NTSC/PAL standard, these signals also contain interference from mutual crosstalk, after demodulation into the luminance and chrominance signal in the receiver. Further interference is produced by unavoidable noise. "Cross-color interference" is the term used for the crosstalk of the luminance signals with respect to the chrominance signal. It makes itself felt, for instance, in the form of shimmering colors in those parts of the image that contain many luminance details. An example would be clashing colors in plaid suits. Noise, on the other hand, also impairs the picture signal. Video recorders or videotapes that have been copied over many times may, for instance, be noise sources, and certain television channels can also exhibit noise.

Both kinds of interference can be reduced considerably with the aid of digital signal processing. The reduction of cross-color interference for professional applications, using complex decoding methods with a plurality of picture memories, is known. The article entitled "Applications of Picture Memories in Television Receivers", by E. J. Berghoff, U. E. Kraus, and J. G. Raven, in IEEE Transactions on Consumer Electronics, Vol. CE-29, No. 3, August 1983, discloses a proposed circuit for non-professional applications, which selectively enables the reduction of noise or cross-color interference. One method for reducing noise in television signals is, for instance, known from the article by H. Schönfelder, "Möglichkeiten der Qualitätsverbesserung beim heutigen Fernsehsystem" [Possibilities for Improving Quality in the Modern Television System], in Fernseh- und Kinotechnik [Video and Film Technology], May 1983.

The disadvantage of the prior art devices is that cross-color interference in the chrominance signals was interpreted as motion, so that the filtering was shut off, and the cross-color interference was not reduced.

It is accordingly an object of the invention to provide a method for the simultaneous reduction of noise and cross-color interference in color television signals and an apparatus for performing the method, which overcomes the hereinafore-mentioned disadvantages of the heretofore-known methods and devices of this general type.

With the foregoing and other objects in view there is provided, in accordance with the invention, a method for the simultaneous reduction of noise and cross-color interference in television signals, which comprises processing a luminance signal and two chrominance signals in a picture processor with a recursive filter, determining filter coefficients for both chrominance signals from the luminance signal with a change detector, and feeding the filter coefficients as input signals to the recursive filter.

In accordance with another mode of the invention, there is provided a method which comprises deriving one filter coefficient for the chrominance signals from a plurality of scanned values of the luminance signal.

In accordance with a further mode of the invention, there is provided a method which comprises deriving the filter coefficient of the chrominance signals from each fourth luminance signal.

In accordance with an added mode of the invention, there is provided a method which comprises taking luminance signals of various video lines into account for defining the filter coefficients.

With the objects of the invention in view, there is also provided an apparatus for the simultaneous reduction of noise and cross-color interference in television signals, comprising a picture processor, the picture processor having a recursive filter for processing a luminance signal and two chrominance signals, and the picture processor having a change detector connected to the recursive filter for determining filter coefficients for both chrominance signals from the luminance signal and feeding the filter coefficients as input signals to the recursive filter, the change detector for the luminance signal having comparison devices with variable thresholds, and two evaluation circuits triggered by the comparison devices for defining the filter coefficients for the luminance signal and the chrominance signals.

In accordance with an additional feature of the invention, the evaluation circuits contain read-only memories being triggered to provide the filter coefficients for the recursive filters.

In accordance with yet another feature of the invention, there is provided a mean value former connected to the change detector for determining a control signal defining the filter coefficients of the chrominance signals after a plurality of scanned luminance signal values.

In accordance with a concomitant feature of the invention, there is provided a signal-to-noise apparatus connected to the change detector for defining the variable thresholds of the comparison devices from the noise of the luminance signal.

An advantage of the invention is that when the information regarding change for the chrominance filter is derived from the luminance signal, the cross-color interference cannot be misinterpreted as a change, so that the recursive filter in the chrominance signal path will therefore not be switched off. The method according to the invention does not notably worsen the chrominance signals, but considerably reduces the cross-color interference in the unmoving parts of the picture. Good reduction when changes occur or when there is motion is furthermore attained.

Other features which are considered as characteristic for the invention are set forth in the appended claims.

Although the invention is illustrated and described herein as embodied in a method for reducing noise and cross-color interference in television signals and an apparatus for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
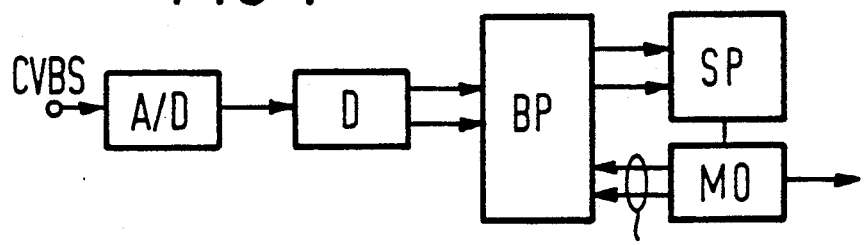
FIG. 1 is a block circuit diagram for explaining digital signal processing in television signals.

Referring now to the FIGURES of the drawing in detail and first, particularly, to FIG. 1 thereof, there is seen a a block circuit diagram illustrating the principle of digital signal processing for television signals. An encoded television signal CVBS that is transmitted is digitally converted with the aid of an analog/digital converter A/D and then supplied to a decoder D. The decoder decodes the digital television signal, so that the luminance and chrominance signals can be supplied to a picture processor BP. The processed signals of the picture processor BP are stored in memory in a half-frame or full-frame picture memory SP and fed through an output circuit MO, on one hand for further processing and on the other hand back to the picture processor BP with a time lag. The apparatus is controlled by a non-illustrated clock generator which generates clocking and synchronizing signals.

Figure 2:
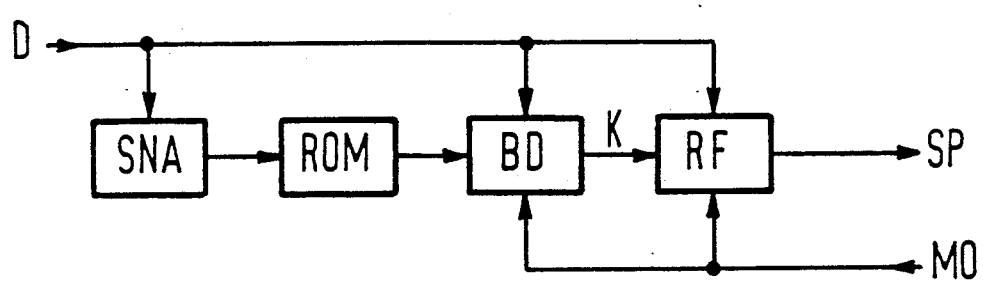
FIG. 2 is a block circuit diagram of the picture processor.

FIG. 2 shows the major elements of the picture processor BP in the form of a block circuit diagram. The decoded luminance and chrominance signals are demultiplexed by an apparatus SNA for signal-to-noise adaptation and then supplied to a change or motion detector BD and a recursive filter RF. The apparatus SNA for signal-to-noise adaptation defines the conditions under which the motion detector BD responds, preferably with the aid of a read-only memory ROM. The motion detector in turn provides filter coefficients K for the recursive filter RF. The outputs of the recursive filter are supplied to the memory SP, so that the values are stored temporarily and re-supplied with a time lag to the motion detector BD and the recursive filter RF.

For normal television program material, there is a high correlation between the picture elements, or pixels, corresponding to one another for successive frames. On the assumption that the noise is a static process, it is possible to reduce the noise, without affecting the signal components, by recursive temporal filtering with the aid of temporary storage in the memory SP. The recursive filter RF is therefore the primary component of the picture processor BP, which processes the current input data and the delayed data. The filter coefficients K define the amount of noise reduction. The processed data obtained in this way are then rewritten into the memory SP for temporary storage for the next processing step. The invention is based on the noise-reduction method described in the article by H. Schönfelder cited above.

The filter function of the recursive filter RF is specified to be such that the filter coefficient K must be less than or equal to 1. K=1 means that the input signal appears unprocessed at the output, and therefore noise reduction is performed. As K decreases, the noise reduction increases.

An important part of the circuit for noise reduction is the motion detector BD, which defines the filter coefficient or coefficients K. The motion detector BD performs a subdivision of the picture into changed and unchanged zones and monitors the operating conditions of the recursive filter RF. It was previously known to provide one motion detector and one recursive filter for each of three signals to be filtered, that is a luminance signal IL and two chrominance signals IB and IR. According to the present invention, with the aid of the motion detector BD, two filter coefficients are derived for each pixel to be processed. A filter coefficient KL monitors the luminance filter, and a filter coefficient KC monitors the chrominance filter. The corresponding pixels in the time multiplex of both chrominance signals are filtered with the aid of the same filter coefficient KC. In order to avoid artifacts in the chrominance signals, or in other words pulling on whites, which causes a loss of picture sharpness, previously known motion detectors had to switch off the noise reduction in all changed picture regions, or in other words had to select the filter coefficient as equal to one. The result was that cross-color interference in the chrominance signals was interpreted as motion, so that the filtering was shut off, and the cross-color interference was not reduced. According to the invention, the filter coefficients for both chrominance signals are derived from the luminance signal, so that if cross-color interference appears, the filtering will not be shut off.

Figure 3:
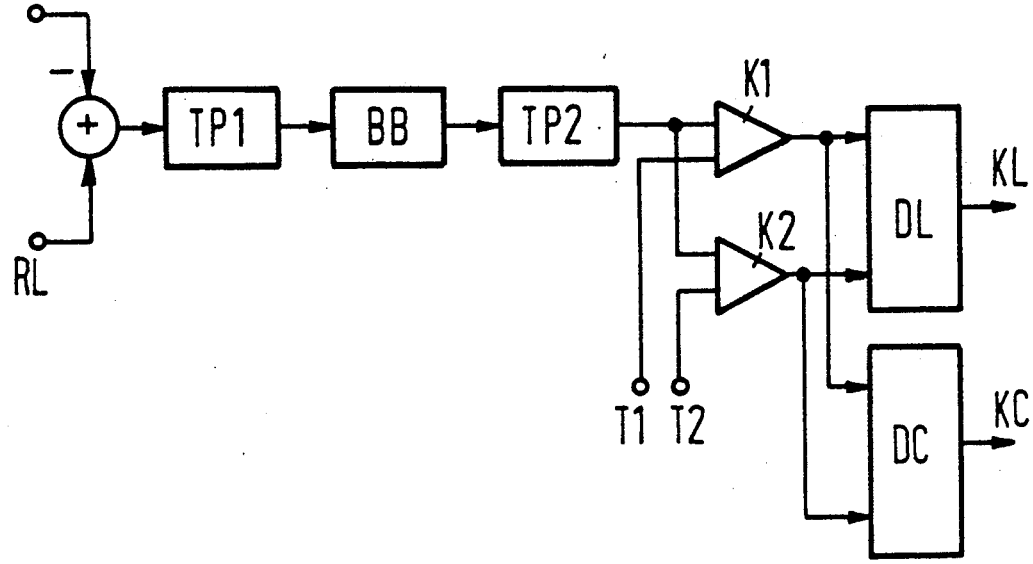
FIG. 3 is a block circuit diagram of a change or motion detector.

FIG. 3 shows a block circuit diagram of a motion detector BD as an exemplary embodiment of an apparatus according to the invention. The corresponding pixels of two successive field regions IL and RL are subtracted from one another, and the difference is delivered to a first low-pass filter TP 1. The word length is defined in a second low-pass filter TP 2 following an amount former BB. The output signal of the second low-pass filter TP 2 is compared with two comparison voltages T1 and T2 in two comparators or comparison devices K1 and K2. The outputs of the comparators K1 and K2 on the one hand control a decoder or evaluation circuit DL for the luminance signal in order to derive the filter coefficient KL, and on the other hand control a decoder or evaluation circuit DC for the chrominance signals in order to derive the filter coefficient KC.

Generally, the filter coefficients will be defined in such a way that if there is no change in motion or a very slight change in motion, the smallest filter coefficient will be used, in order to attain the best noise reduction. For small changes between individual picture regions, greater noise is allowed. In other words, the noise reduction is reduced. If fast motion is ascertained, the filter is shut off. In other words, the coefficient K is selected to be equal to 1. This kind of definition of coefficients guarantees a maximum of noise reduction and a minimum of virtually all visible pulling on whites. The remaining pulling on whites and the remaining noise is usually tolerable, because the human eye has a reduced sensitivity when there are changes in motion.

Since the definitive filter coefficients can be derived solely from the luminance signals IL or RL, which form the inputs of the motion detector BD according to the invention, the cross-color interference of the luminance signal with the chrominance channel cannot be mistaken for motion or change in the chrominance channel, so that the recursive filter is not switched off. Since the chrominance channel has no motion detector of its own and is monitored with the aid of the luminance signal, the recursive filter remains active for the chrominance signal.

The method according to the invention does not cause any perceptible impairment of the chrominance signals, but significantly reduces cross-color interference in unmoving portions of the picture, while good reduction is attained in portions of the picture having motion.

In order to attain optimal performance, the filter performance must be adapted to the signal-to-noise ratio of the input signal. In general, disruptive pulling on white increases with increasing noise reduction. In other words, if the quality of the original television signal is good, major noise reduction is unnecessary. It is accordingly appropriate for the amount of noise reduction to be adapted to the noise components of the input signal. In FIG. 2, the apparatus SNA for the signal-to-noise adaptation, preferably with the aid of a ROM, defines the comparison voltages or thresholds T1 and T2 at which the comparators K1 and K2 of the motion detector BP respond. In this way, optimization of the filter coefficients of the luminance and chrominance signals is additionally attained.

Figure 4:
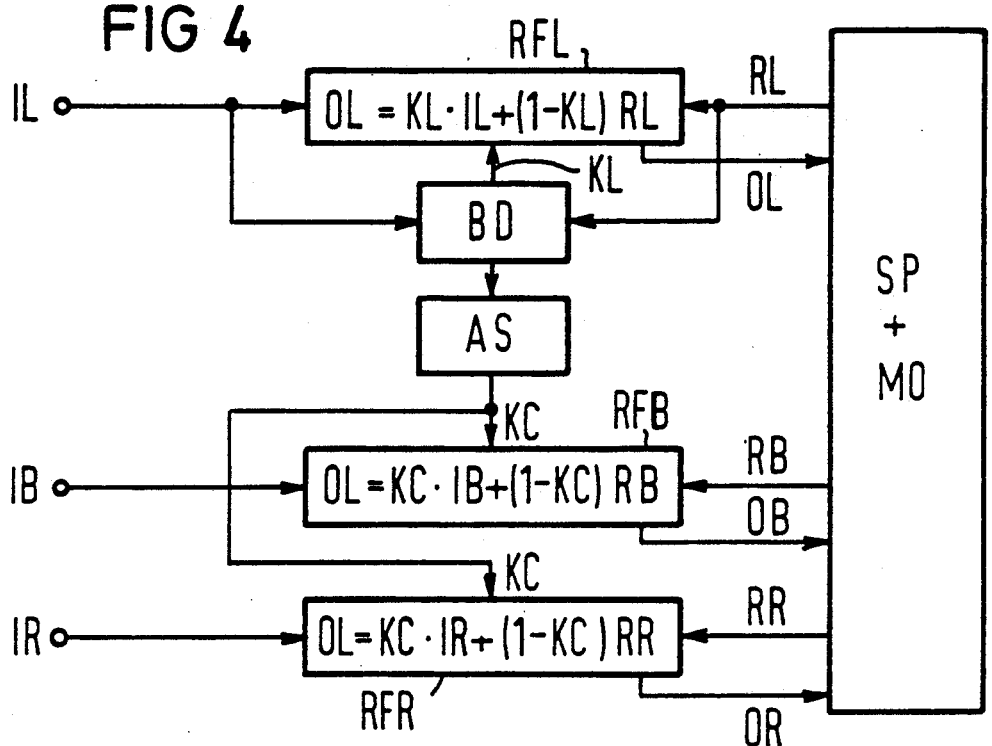
FIG. 4 is a block circuit diagram of an apparatus according to the invention for performing the method according to the invention.

The exemplary embodiment of FIG. 4 shows the principle of the method and apparatus according to the invention, in the form of a block circuit diagram The luminance signal IL, together with the delayed corresponding signal RL emitted by the memory SP, are delivered on one hand to a recursive filter RFL and on the other hand to a motion detector BD. As described above, the motion detector BD defines the filter coefficient KL for the recursive filter RFL. The luminance signal, which is processed with the aid of the filter, is in turn temporarily stored on the output side in the memory SP as a filtered luminance signal OL. On the other hand, an evaluation circuit AS which is triggered with the aid of the motion detector BD, defines the filter coefficient KC for the chrominance signals. Depending on the luminance signal IL or RL, chrominance signals IB and RB, on one hand, and IR and RR, on the other hand, are each delivered to a respective recursive filter RFB and RFR. The chrominance signals are recursively filtered with the aid of the filter coefficient KC determined by the evaluation circuit AS, and the result of the filtration is fed to and again temporarily stored in the picture memory SP as filtered chrominance signals OB and OR.

Figure 5:
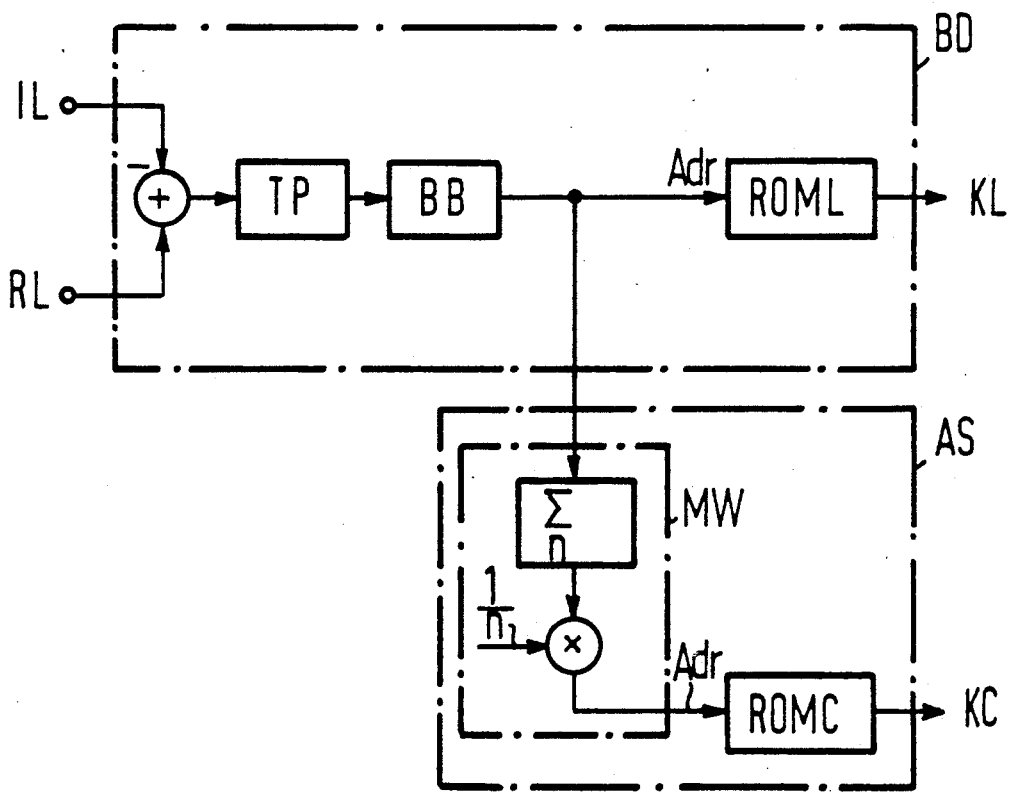
FIG. 5, a block circuit diagram of an exemplary embodiment for the derivation of filter coefficients according to the invention.

FIG. 5 shows a simple exemplary embodiment for a motion detector BD and for the evaluation circuit AS. As in FIG. 3, the corresponding luminance signals IL and RL are initially subtracted from one another, the difference is supplied to a low-pass filter, and the absolute amount is formed from the output signal of the filter. The output of the amount former BB addresses a decoder constructed in the form of a read-only memory ROML, for deriving the filter coefficient KL. On the other hand, the output of the amount former BB is supplied to an accumulator or mean value former MW in the evaluation circuit AS, which adds the four values and from them forms a mean value. This mean value in turn addresses a decoder constructed as a read-only memory ROMC, for deriving the filter coefficient KC for the chrominance signals.

FIG. 5 assumes a television system in which the luminance signal is scanned at a frequency four times higher than that for the chrominance signals, as in the PAL system. Accordingly, the filter coefficient KC only needs to change upon each fourth coefficient KL.

However, according to the invention other derivations of the filter coefficients are also possible, if a differently structured motion detector is present and/or if the input values for the evaluation circuit AS are picked up at some other point of the motion detector. It is also possible to consider the information from adjacent television lines. Such respectively specific embodiments lie within the knowledge of one of ordinary skill in the art.

The foregoing is a description corresponding in substance to German Application P 38 18 539.3, dated May 31, 1988, the International priority of which is being claimed for the instant application, and which is hereby made part of this application. Any material discrepancies between the foregoing specification and the aforementioned corresponding German application are to be resolved in favor of the latter.

What is claimed is:

1. Method for the simultaneous reduction of noise and cross-color interference in television signals, which comprises processing a luminance signal and two chrominance signals in a picture processor with a recursive filter, determining filter coefficients for both chrominance signals form the luminance signal with a change detector, and deriving the filter coefficients for both chrominance signals from the luminance signal.

2. Method according to claim 1, which comprises deriving one filter coefficient for the chrominance signals from a plurality of scanned values of the luminance signal.

3. Method according to claim 2, which comprises deriving the filter coefficient of the chrominance signals from each fourth luminance signal.

4. Method according to claim 1, which comprises taking luminance signals of various video lines into account for defining the filter coefficients.

5. Apparatus for the simultaneous reduction of noise and cross-color interference in television signals, comprising a picture processor, said picture processor having a recursive filter for processing a luminance signal and two chrominance signals, and said picture processor having a change detector connected to said recursive filter for determining filter coefficients for both chrominance signals from the luminance signal and feeding the filter coefficients as input signals to said recursive filter, said change detector for the luminance signal having comparison devices with variable thresholds, and two evaluation circuits triggered by said comparison devices for defining the filter coefficients for the luminance signal and the chrominance signals.

6. Apparatus according to claim 5, wherein said evaluation circuits contain read-only memories being triggered to provide the filter coefficients for said recursive filters.

7. Apparatus according to claim 5, including a mean value former connected to said change detector for determining a control signal defining the filter coefficients of the chrominance signals after a plurality of scanned luminance signal values.

8. Apparatus according to claim 5, including a signal-to-noise apparatus connected to said change detector for defining the variable thresholds of said comparison devices from the noise of the luminance signal.

* * * * *